United States Patent 3,734,948
Patented May 22, 1973

3,734,948
CARBAMATES OF p-HYDROXYBENZOATES
Henri Sidi, Paramus, N.J., assignor to Tenneco Chemicals, Inc.
No Drawing. Filed Feb. 18, 1971, Ser. No. 116,607
Int. Cl. C07c *125/06*
U.S. Cl. 260—473 R          6 Claims

ABSTRACT OF THE DISCLOSURE

Compounds that have the structural formula

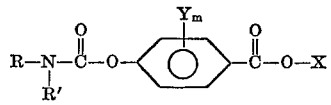

wherein R represents an alkyl group, an alkenyl group, or

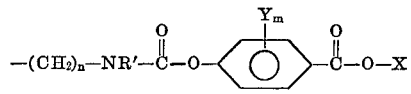

R′ represents hydrogen or an alkyl group; X represents an alkyl group, —(CH$_2$)$_n$—OH, or —CH$_2$)$_n$—OCONRR′; Y represents an alkyl group or an alkoxy group; $m$ represents an integer in the range of 0 to 2; and $n$ represents an integer in the range of 2 to 6 are used to protect surface-coating compositions from deterioration resulting from attack by fungi and other microorganisms. Illustrative of these carbamates are ethylene glycol mono-p-hydroxybenzoate N-methyl carbamate and ethyl 3-methoxy-4-hydroxybenzoate N-methyl carbamate.

This invention relates to surface-coating compositions that have improved resistance to deterioration resulting from attack by fungi, bacteria, and other microorganisms. More particularly, it relates to surface-coating compositions that contain biocidal amounts of carbamates of p-hydroxybenzoic acid esters.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi and bacteria. Others, for example, aqueous dispersions of water-insoluble synthetic linear polymers, generally contain as plasticizers and thickeners materials that have their origin in animal or vegetable sources and that render the compositions susceptible to mildew. The resulting deterioration of the surface-coating compositions seriously hinders their full scale utilization, particularly in those areas and in those applications that are conducive to such attack.

Various biocidal materials have been suggested for use in surface-coating compositions, but none has proven entirely satisfactory in this application. Some do not provide the required prolonged protection against attack by microorganisms, while other undergo sulfide staining and still others hydrolyze in alkaline aqueous paint systems or separate from the applied coating by migration, volatilization, or leaching once the coating has been spread in a thin layer over the surface to be protected.

This invention relates to biocides that are of particular value in surface-coating compositions. These biocides, which are thoroughly compatible with the resinous binders that commonly are used in surface-coating compositions and which are resistant to sulfide staining, provide excellent and prolonged resistance to deterioration resulting from attack by fungi and other microorganisms without adversely affecting the color, pH, viscosity, and other physical properties of the surface-coating compositions.

The biocidal compounds that are used in the surface-coating compositions of this invention are carbamates of p-hydroxybenzoic acid esters. These carbamates may be represented by the structural formula

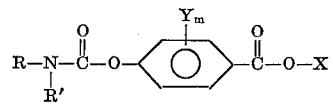

wherein R represents an alkyl group having from 1 to 18 carbon atoms, an alkenyl group having from 2 to 8 carbon atoms, or

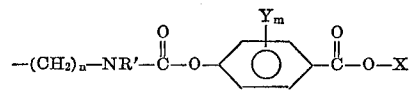

R′ represents hydrogen or an alkyl group having from 1 to 5 carbon atoms; X represents an alkyl group having from 1 to 5 carbon atoms, —(CH$_2$)$_n$—OH, or

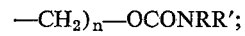

—CH$_2$)$_n$—OCONRR′;

Y represents an alkyl group having from 1 to 5 carbon atoms or an alkoxy group having from 1 to 5 carbon atoms; $m$ represents an integer in the range of zero to 2; and $n$ represents an integer in the range of 2 to 6.

Illustrative of these carbamates are the following:

methyl p-hydroxybenzoate N-methyl carbamate,
methyl p-hydroxybenzoate N-tert. butyl carbamate,
methyl p-hydroxybenzoate N-octadecyl carbamate,
butyl p-hydroxybenzoate N-vinyl carbamate,
ethyl p-hydroxybenzoate N,N-dimethyl carbamate,
methyl p-hydroxybenzoate N,N-diamyl carbamate,
n-amyl p-hydroxybenzoate N-allyl carbamate,
ethyl p-hydroxybenzoate N-octenyl carbamate,
n-amyl p-hydroxybenzoate N,N-diethyl carbamate,
methyl 2,3-dimethyl-4-hydroxybenzoate N-ethyl carbamate,
ethyl 3-butyl-4-hydroxybenzoate N-methyl carbamate,
methyl 2-amyl-4-hydroxybenzoate N-methyl carbamate,
ethyl 2,6-dimethoxy-4-hydroxybenzoate N,N-diethyl carbamate,
ethyl 3-amyloxy-4-hydroxybenzoate N-vinyl carbamate,
isopropyl 2,3-dibutoxy-4-hydroxybenzoate N-methyl carbamate,
ethylene glycol mono-p-hydroxybenzoate N-methyl carbamate,
propylene glycol mono-3-methoxy-4-hydroxybenzoate N,N-dibutyl carbamate,
hexylene glycol mono-2,3-dimethyl-4-hydroxybenzoate N-methyl carbamate,
ethylene glycol mono-p-hydroxybenzoate bis-(N-methyl carbamate),
butylene glycol mono-3,6-diamyloxy-4-hydroxybenzoate bis-(N,N-dimethyl carbamate),
1,6-bis-(4-carbomethoxyphenylcarbamoxy)hexane, and the like. One or more of these carbamates may be present in the surface-coating compositions of this invention.

Surface-coating compositions that have a particularly advantageous combination of properties are obtained when the biocide is a carbamate that has one of the following structural formulas (A)

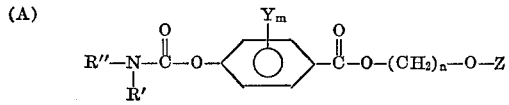

(B)

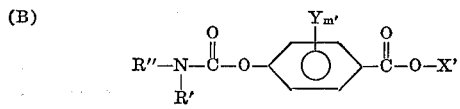

wherein R', Y, m, and n have the aforementioned significance, m' represents an integer in the range of 1 to 2; X' represents an alkyl group having from 1 to 5 carbon atoms; Z represents hydrogen or

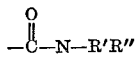

and R" represents an alkyl group having from 1 to 18 carbon atoms. Illustrative of these preferred compounds are ethylene glycol mono-p-hydroxybenzoate N-methyl carbamate, ethylene glycol mono-p-hydroxybenzoate bis (N-methyl carbamate), and ethyl 3-methoxy-4-hydroxybenzoate N-methyl carbamate.

In addition to being useful in the preservation of surface-coating compositions, the carbamates of this invention can be used as agricultural fungicides, since they can be applied to plants or to the soil in which plants are growing to control the growth of a number of plant pathogens without causing visible injury to the plants.

The biocidal compounds of this invention may be prepared by any suitable and convenient procedure. For example, they can be prepared by the reaction of an ester of p-hydroxybenzoic acid with the appropriate isocyanate in the presence of a small amount of an amine, such as triethylamine. This reaction is usually carried out in a solvent, such as diethyl ether or tetrahydrofuran, at a temperature below the boiling point of the isocyanate. In most cases the reaction is carried out at a temperature between 30° C. and 60° C. and preferably between 35° C. and 40° C.

The carbamates of this invention can be used to impart fungal and bacterial resistance to a wide variety of surface-coating compositions including both organic solvent-based and water-based coating systems. They are particularly valuable as biocides in water-based coatings that contain as their resinous binder a water-insoluble synthetic linear addition polymer.

In a preferred embodiment of the invention, the carbamates are used in aqueous dispersions that contain about 10 percent to 60 percent by weight of a water-insoluble resinous binder that is an oleoresinous binder or a synthetic linear addition binder. Suitable oleoresinous binders include drying oils, such as linseed oil, tung oil, soybean oil, dehydrated castor oil, safflower oil, or fish oil; bodied drying oils; blends of drying oils or bodied drying oils with a resin component, such as limed rosin, an ester gum, or a phenolic resin; oleoresinous varnishes formed by heating one of the aforementioned resins with one or more drying oils or bodied drying oils; and alkyd resins, which are resinous products resulting from the reaction of a polyhydric alcohol, such as pentaerythritol or glycerol, with a dicarboxylic acid, such as phthalic anhydride, and fatty acids.

The useful aqueous dispersions of synthetic linear addition polymers are ordinarily prepared by the emulsion polymerization of ethylenically unsaturated compounds, especially those of monoethylenically unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with vinyl chloride; copolymers of vinyl acetate with acrylonitrile; copolymers of vinyl chloride with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and copolymers of styrene with maleic anhydride.

Only a small concentration of the carbamate need be present in the surface-coating compositions of this invention. It has been found that as little as 0.10 percent of one or more of these compounds, based on the weight of the composition, will bring about an appreciable improvement in the resistance of the composition to attack by microorganisms. Three percent or more of the biocidal compounds can be used, but these large amounts generally do not provide further improvement in the properties of the surface-coating compositions and for this reason are not ordinarily used. While the amount of the biocidal compound that will provide optimum protection for a surface-coating composition depends upon such factors as the choice of biocidal compound, the choice of resinous binder and other components of the surface-coating composition and the amount of each that is used, and the application for which the coating composition is intended, in most cases about 1 percent to 2 percent of the carbamate, based on the weight of the surface-coating composition, is used.

In addition to the resinous binder and the carbamate, the surface-coating compositions of this invention may contain various auxiliary materials, such as pigments, extenders, solvents, dyes, defoaming agents, driers, emulsifiers, plasticizers, and the like in the amounts ordinarily used for these purposes.

The carbamate that is used as the biocide may be incorporated into the surface-coating composition by any convenient procedure. For example, it can be combined with the pigments and other components to form a pigment phase that is mixed with the resinous binder and water or organic solvent to form the surface-coating composition. Alternatively, it can be added to a composition that contains the resinous binder, pigment, and water or organic solvent. The carbamate can be added as such to the other components, or it can be added as a solution in, for example, an alcohol, ether, or ketone.

The invention is further illustrated by the examples that follow:

EXAMPLE 1

To a mixture of 76 grams (0.5 mole) of methyl p-hydroxybenzoate, 1 ml. of triethylamine, and 200 ml. of tetrahydrofuran was added 30 grams (0.527 mole) of methyl isocyanate while the mixture was stirred and cooled to maintain its temperature at about 40° C. At the end of the addition of the methyl isocyanate, the reaction mixture was stirred at room temperature for 4 hours during which time a precipitate formed. The precipitate was separated by filtration and dried to constant weight in a vacuum oven at 60° C. The dry product weighed 59.2 grams. A second crop that weighed 16.5 grams was obtained. The total yield of methyl p-hydroxybenzoate N-methyl carbamate was 72.5 percent of theory. The product, which melted at 125.5°–126° C., was found to contain 58.4 percent C, 5.6 percent H, and 6.7 percent N (calculated for $C_{10}H_{11}NO_4$, 57.4 percent C, 5.3 percent H, and 6.7 percent N). The structure of the compound was confirmed by infrared analysis.

EXAMPLES 2–13

A series of carbamates was prepared by the procedure described in Example 1. The carbamates that were prepared and their melting points are given in Table I. In each case the structure of the compound was confirmed by infrared analysis.

TABLE I

| Ex. No. | Carbamate | M.P. (°C.) |
|---|---|---|
| 2 | Ethyl p-hydroxybenzoate N-methyl carbamate | 117–119 |
| 3 | n-Propyl p-hydroxybenzoate N-methyl carbamate | 111–115 |
| 4 | n-Butyl p-hydroxybenzoate N-methyl carbamate | 82–85 |
| 5 | n-Amyl p-hydroxybenzoate N-methyl carbamate | 69–72 |
| 6 | Methyl p-hydroxybenzoate N,N-dimethyl carbamate | 87–95 |
| 7 | Ethyl p-hydroxybenzoate N-propyl carbamate | |
| 8 | Methyl p-hydroxybenzoate N-tert.butyl carbamate | 86–90 |
| 9 | Methyl p-hydroxybenzoate N-octadecyl carbamate | 92–100 |
| 10 | Methyl p-hydroxybenzoate N-allyl carbamate | 95–100 |
| 11 | Ethyl 3-methoxy-4-hydroxybenzoate N-methyl carbamate | 116–123 |
| 12 | Methyl 2,6-dimethoxy-4-hydroxybenzoate N-methyl carbamate | 160–176 |
| 13 | 1,6-bis-(4-carbomethoxyphenylcarbamoxy)hexane | 183–191 |

EXAMPLE 14

To a mixture of 30 grams (0.165 mole) of ethylene glycol mono-p-hydroxybenzoate, 1 ml. of triethylamine and 150 ml. of tetrahydrofuran was added 9.5 grams (0.166 mole) of methyl isocyanate dropwise while the reaction mixture was stirred and cooled to maintain its temperature at about 40° C. At the end of this addition, the reaction mixture was stirred at room temperature for 6 hours during which time a precipitate formed. The precipitate was separated by filtration and dried to constant weight in a vacuum oven at 60° C. The dry product weighed 15.2 grams. The filtrate was evaporated to dryness under vacuum. The residue was reslurried in 100 ml. of hot benzene, cooled, filtered, and dried under vacuum to give a second crop that weighed 15.5 grams. The total yield of ethylene glycol mono-p-hydroxybenzoate N-methyl carbamate was 78 percent of theory. The product was found to contain 56.6 percent C, 5.79 percent H, and 5.77 percent N (calculated for $C_{11}H_{13}NO_5$, 55.2 percent C, 5.43 percent H, and 5.86 percent N). The structure of the compound was confirmed by infrared analysis.

EXAMPLE 15

To a mixture of 30 grams (0.165 mole) of ethylene glycol mono-p-hydroxybenzoate, 1 ml. of triethylamine and 150 ml. of tetrahydrofuran was added 19 grams (0.333 mole) of methyl isocyanate dropwise while the reaction mixture was stirred and cooled to maintain its temperature at about 40° C. At the end of this addition, the reaction mixture was stirred at room temperature for 6 hours. The precipitate that formed was separated by filtration and dried in a vacuum oven at 60° C. The dry product weighed 10.5 grams. The filtrate was evaporated to dryness; the residue was recrystallized from 200 ml. of petroleum ether (B.P.—70° to 110° C. There was obtained a second crop that weighed 30.5 grams. The total yield of ethylene glycol mono-p-hydroxybenzoate bis(N-methyl carbamate) was 83.8 percent of theory. The product was found to contain 55.18 percent C, 6.13 percent H, and 8.98 percent N (calculated for $C_{13}H_{16}N_2O_6$, 52.7 percent C, 5.41 percent H, and 9.45 percent N). The structure of the compound was confirmed by infrared analysis.

EXAMPLE 16

(A) A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| 2% aqueous solution of methylcellulose | 200 |
| Diethyl ether of diethylene glycol | 37 |
| 55% aqueous solution of polyvinyl acetate | 350 |

To samples of this paint was added either 2 percent by weight of one of the carbamates of this invention or 2 percent by weight of a comparative biocide.

(B) An acrylic paint was prepared by mixing together the following materials:

| | Parts by weight |
|---|---|
| Water | 250 |
| Acrylic acid resin (100% solids) (Acryloid B–66) | 385 |
| Monoethyl ether of ethylene glycol | 259 |
| Titanium dioxide | 143 |
| Aluminum silicate | 45 |
| Magnesium silicate | 98 |

To samples of this paint was added either 2 percent by weight of one of the carbamates of this invention or 2 percent by weight of a comparative biocide.

(C) An exterior house paint was prepared by mixing together the following materials:

| | Parts by weight |
|---|---|
| Basic lead carbonate | 288 |
| Zinc oxide | 232 |
| Titanium dioxide (rutile) | 149 |
| Talc | 260 |
| Linseed oil | 242 |
| Bodied linseed oil | 114 |
| Mineral spirits | 114 |
| Antiskinning agent (Exkin 2) | 2 |
| Manganese naphthenate (6%) | 2.27 |
| Lead naphthenate (24%) | 11.3 |

To samples of this paint was added 2 percent by weight of either one of the carbamates of this invention or a comparative biocide.

EXAMPLE 17

Samples of the acrylic paint, the polyvinyl acetate paint, and the oil-based paint whose preparation was described in Example 16 were evaluated by the following procedure: Pieces of drawdown paper were dipped into the paint, dried for 24 hours, and again dipped into the paint. After a 24-hour drying period, the coated paper samples were cut into 1¼ inch squares. Each of the coated paper squares was placed on a plate of malt and mycophil agar, which had been inoculated with 1 ml. of a suspension of the test organism. The plates, prepared in triplicate, were incubated at 28° C. and observed weekly. The growth was estimated according to the following key, and the results of the triplicate plates were averaged. In the tables that follow:

ZO=Zone of inhibition in mm.
O=No zone of inhibition
Tr=Trace zone
1–9=Increasing amounts of growth on specimen.

The biocidal compounds tested and the results obtained are set forth in Tables II, III, and IV.

TABLE II

[Resistance of acrylic paint films containing carbamates of p-hydroxybenzoates to attack by fungi]

| | Fungi | | |
|---|---|---|---|
| Biocide | Pullularia pullulans | Penicillium crustosum | Aspergillus niger |
| Product of example: | | | |
| 2 | ZO–2 | ZO–4 | Tr |
| 3 | ZO–2 | ZO–3 | Tr |
| 4 | ZO–1 | ZO–2 | Tr |
| 8 | ZO–5 | ZO–2 | 0 |
| 11 | ZO–10 | ZO–5 | ZO–2 |
| 12 | ZO–3 | ZO–6 | ZO–20 |
| 15 | ZO–2 | ZO–2 | Tr |
| Comparative biocides: | | | |
| Bis(phenylmercury)-dodecenyl succinate (Super Ad-it) | ZO–10 | ZO–1 | ZO–11 |
| 2,3,5,6-tetrachloro-4-(methylsulfonyl)-pyridine (Dow 1013) | ZO–10 | ZO–9 | ZO–7 |

TABLE III

[Resistance of polyvinyl acetate paint films containing carbamates of p-hydroxybenzoates to attack by fungi]

| Biocide | Fungi | | |
|---|---|---|---|
| | Pullularia pullulans | Penicillium crustosum | Aspergillus niger |
| Product of example: | | | |
| 1 | ZO-5 | ZO-1 | ZO-2 |
| 2 | ZO-7 | ZO-3 | ZO-1 |
| 3 | ZO-2 | ZO-2 | Tr |
| 4 | ZO-2 | ZO-2 | Tr |
| 8 | 0 | ZO-2 | 0 |
| 10 | ZO-5 | 0 | 0 |
| 11 | ZO-6 | ZO-5 | Tr |
| 12 | ZO-3 | ZO-6 | ZO-20 |
| 15 | ZO-11 | ZO-2 | ZO-1 |
| Comparative biocides: | | | |
| Bis(phenylmercury)-dodecenylsuccinate (Super Ad-it) | ZO-10 | ZO-10 | ZO-8 |
| 2,3,5,6-tetrachloro-4-(methylsulfonyl)-pyridine (Dow 1013) | ZO-12 | ZO-7 | ZO-8 |

TABLE IV

[Resistance of oil-based paint films containing carbamates of p-hydroxybenzoates to attack by fungi]

| Biocide | Fungi | | |
|---|---|---|---|
| | Pullularia pullulans | Penicillium crustosum | Aspergillus niger |
| Product of example: | | | |
| 1 | ZO-3 | ZO-1 | ZO-1 |
| 2 | ZO-4 | ZO-3 | Tr |
| 3 | Tr | ZO-1 | Tr |
| 4 | Tr | ZO-2 | Tr |
| 8 | ZO-5 | ZO-2 | 0 |
| 10 | ZO-3 | ZO-6 | 0 |
| 11 | ZO-5 | ZO-7 | Tr |
| 15 | ZO-2 | ZO-4 | ZO-1 |
| Comparative biocides: | | | |
| Bis(phenylmercury) dodecenylsuccinate (Super Ad-it) | ZO-10 | ZO-7 | ZO-13 |
| 2,3,5,6-tetrachloro-4-(methylsulfonyl)-pyridine (Dow 1013) | ZO-11 | ZO-10 | ZO-9 |

EXAMPLE 18

Samples of the acrylic paint and the polyvinyl acetate paint whose preparation was described in Example 16 were applied to cedar panels that where then exposed on a test fence in Florida. The panels were inspected periodically to determine the amount of microbial growth on the paint films. The results obtained are summarized in Table V. In this table 0 indicates no microbial growth; 2, slight growth; 4, slight to moderate growth; 6, moderate growth; 8, moderate to heavy growth; and 10, heavy growth.

TABLE V

| Months on test fence | Biocide | Microbial growth on paint film | |
|---|---|---|---|
| | | PVA paint | Acrylic paint |
| 5 | Product of Ex. 1 | 0 | 0 |
| | Dow 1013 | 0 | 0 |
| | Super Ad-it | 0 | 0 |
| | None | 4 | 0 |
| 7 | Product of Ex. 1 | 4 | 2 |
| | Dow 1013 | 0 | 0 |
| | Super Ad-it | 2 | 2 |
| | None | 6 | 2 |
| 9 | Product of Ex. 1 | 4 | 2 |
| | Dow 1013 | 2 | 2 |
| | Super Ad-it | 2 | 2 |
| | None | 6 | 2 |
| 15 | Product of Ex. 1 | 4 | 2 |
| | Dow 1013 | 2 | 2 |
| | Super Ad-it | 4 | 4 |
| | None | 8 | 8 |
| 24 | Product of Ex. 1 | 4 | 4 |
| | Dow 1013 | 2 | 2 |
| | Super Ad-it | 4 | 4 |
| | None | 8 | 8 |

From the data in the foregoing tables it will be seen that the carbamates of p-hydroxybenzoates are effective biocides for paints. They impart to the paints resistance to attack by microorganisms, but do not affect their pH, color, viscosity, or heat aging characteristics. Unlike those that contain bis-(phenylmercuric)dodecenylsuccinate as the biocide, the paint films that contain the carbamates do not undergo gray or black staining when they are exposed to hydrogen sulfide.

EXAMPLE 19

Separate lots of sterilized soil were inoculated with plant pathogens. The inoculated soil was placed in 4 ounce containers, and the soil in each container was drenched with an amount of an aqueous solution containing one of the carbamates of this invention equivalent to 300 pounds per acre. After incubation for 2 days at 70° F., the amount of mycelial growth on the surface of the soil was noted. The results obtained are summarized in Table VI. In this table an Effectiveness Rating of 5 indicates that there was no mycelial growth, 4 indicates that there were a few scattered colonies on the surface of the soil, 3 indicates that the surface was half covered with colonies, 2 indicates that the surface was three-quarters covered with colonies, and 1 indicates that the surface was completely covered with mycelial growth.

TABLE VI

| Ex. No. | Biocide | Effectiveness rating | | | |
|---|---|---|---|---|---|
| | | Sclerotium rolfsii | Pythium sp. | Rhizoctonia solani | Fusarium oxysporum |
| 18A | Product of Ex. 1 | 4 | 4 | 3 | 2 |
| 18B | Product of Ex. 14 | 4 | 4 | 3 | 2 |
| 18C | Product of Ex. 15 | 4 | 2 | 3 | 4 |

Each of the other carbamates that are disclosed herein can also be used to protect surface-coating compositions from deterioration resulting from attack by fungi and other microorganisms.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

I claim:

1. A compound having the structural formula

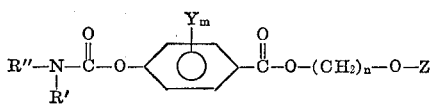

wherein $R'$ represents hydrogen or an alkyl group having from 1 to 5 carbon atoms; $R''$ represents an alkyl group having from 1 to 18 carbon atoms; $Y$ represents an alkoxy group having from 1 to 5 carbon atoms or an alkyl group having from 1 to 5 carbon atoms; $Z$ represents hydrogen or

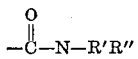

$m$ represents an integer in the range of 0 to 2; and $n$ represents an integer in the range of 2 to 6.

2. The compound having the structure set forth in claim 1 wherein $R'$ is hydrogen, $R''$ is methyl, $Z$ is hydrogen, $m$ is 0, and $n$ is 2.

3. The compound having the structure set forth in claim 1 wherein $Z$ is

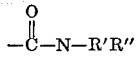

each $R'$ is hydrogen, each $R''$ is methyl, $m$ is 0 and $n$ is 2.

4. A compound having the structural formula

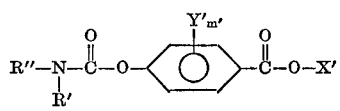

wherein R' represents hydrogen or an alkyl group having from 1 to 5 carbon atoms; R'' represents an alkyl group having from 1 to 18 carbon atoms; Y' represents an alkoxy group having from 1 to 5 carbon atoms; X' represents an alkyl group having from 1 to 5 carbon atoms; and $m'$ represents an integer in the range of 1 to 2.

5. The compound that has the structural formula

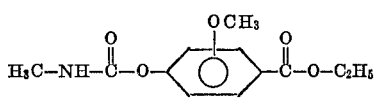

6. The compound that has the structural formula

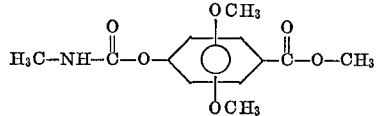

References Cited

UNITED STATES PATENTS 3,488,380    1/1970    Goldhamer _____ 260—471 R

OTHER REFERENCES

Rekker et al., Chem. Abst. 62, 4029 (1965).
Gonzalez et al., C. A. 67, 2833f (1967).

LORRAINE A. WEINBERGER, Primary Examiner

J. F. TERAPANE, Assistant Examiner

U.S. Cl. X.R.

106—15; 424—308